(No Model.)
G. W. BENNETT.
LOCK CLAMP FOR SECURING CRANKS TO AXLES.
No. 543,283. Patented July 23, 1895.
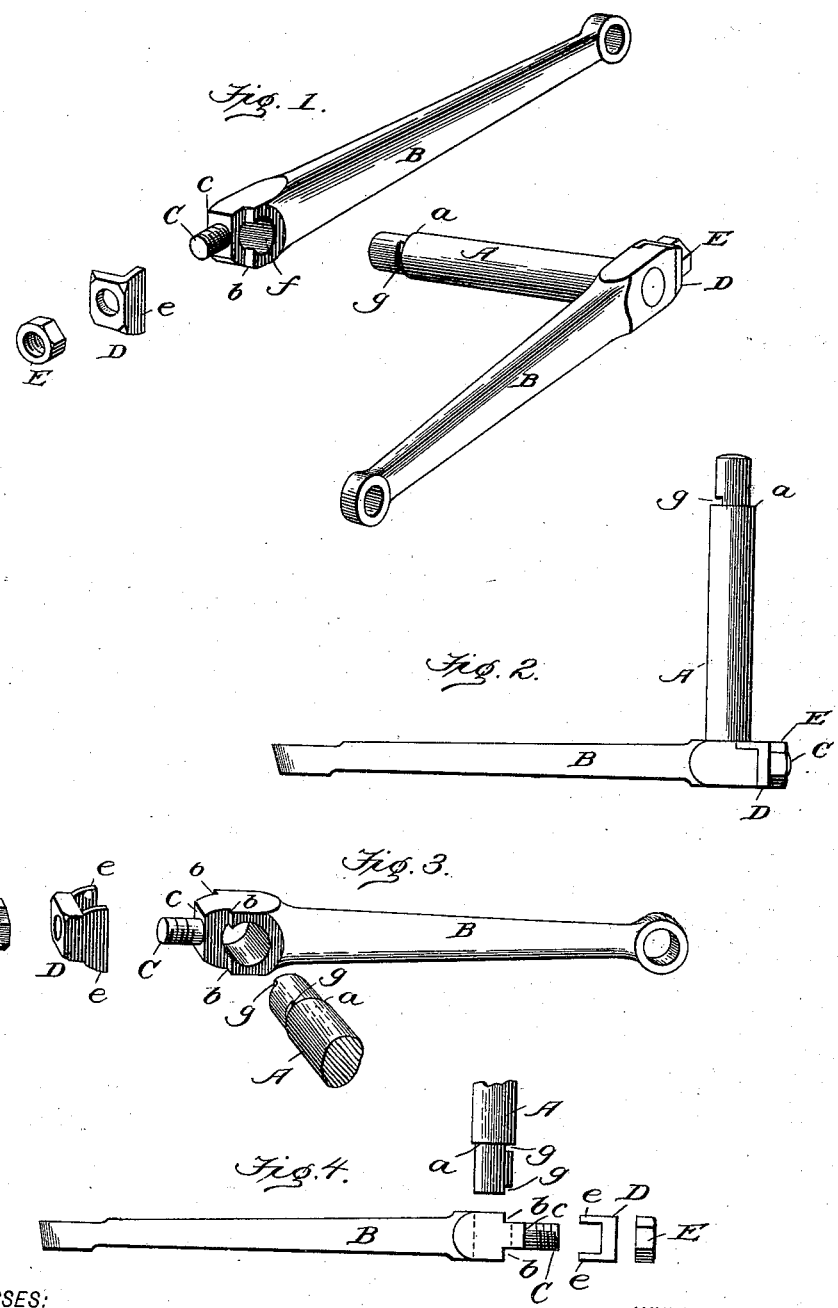
WITNESSES:
Edwin L. Bradford
N. Curtis Lammond
INVENTOR
George W. Bennett.
BY
Andrew McIntire
ATTORNEY.

UNITED STATES PATENT OFFICE.

GEORGE W. BENNETT, OF TOLEDO, OHIO.

LOCK-CLAMP FOR SECURING CRANKS TO AXLES.

SPECIFICATION forming part of Letters Patent No. 543,283, dated July 23, 1895.

Application filed May 22, 1895. Serial No. 550,242. (No model.)

*To all whom it may concern:*

Be it known that I, GEORGE W. BENNETT, a citizen of Great Britain, residing at Toledo, in the county of Lucas and State of Ohio, have invented certain new and useful Improvements in Lock-Clamps for Securing Cranks to Axles; and I do hereby declare the following to be a full, clear, and exact description of the invention, such as will enable others skilled in the art to which it appertains to make and use the same.

My invention relates to certain new and useful improvements in means for securing cranks to bicycle-axles. It has for its object to dispense with the usual cotter-pins and to provide a means which shall be simple and economic of construction and certain and efficacious in use. The most practical means in general use is the ordinary cotter-pin which passes through the head of the crank and a groove or channel cut in the cylindrical face of the axle, the pin being of taper form with its smaller end threaded and provided with a screw-nut. It has been found in practice that the radial projections of the pin and nut constitute means for readily catching dust and dirt, and that not infrequently serve to catch the garments of female riders, and that they are also liable to become loose, owing to the constantly-changing position of the head of the pin and the securing-nut during the revolution of the axle.

My invention is designed to overcome all these objections and to provide a fastening clamp or lock which shall constitute a slight longitudinal prolongation of the crank and giving a neat and symmetrical appearance to the same; and with these ends in view my invention consists in the peculiarities of construction and arrangement hereinafter more fully described and specifically claimed.

In order that those skilled in the art to which my invention appertains may know how to make and apply my improved clamp, I will proceed to describe the same, referring by letters to the accompanying drawings, in which—

Figure 1 is a perspective view showing an axle with one crank in place and the other removed and embodying the features of my invention. Fig. 2 is a top or plan view of an axle with one crank secured thereto, the clamping device being also shown. Fig. 3 is a perspective view of an axle, crank, and fastening devices unassembled, and showing a modification of the clamping device or of duplex form; and Fig. 4 is a plan view of the parts, as shown in Fig. 3.

Similar letters of reference indicate like parts in the several figures.

A is the axle, which is preferably reduced slightly at each end to form shoulders $a$, against which the inside face of the crank comes in contact.

B is the crank, the head of which is cut away, as shown at $b$, and which is provided with a screw-threaded prolongation C of reduced size, leaving a surrounding shoulder $c$ to receive and support the locking-clamp D, which is bored centrally to pass over the screw C and formed with a wing $e$ to fit the cut-away portion $b$ of the crank, which cut-away portion extends, as clearly shown, slightly into the cylindrical hole $f$, which fits over the reduced end of the axle A.

The reduced portion of the axle A is formed with a transverse groove or channel $g$, which is so located that when the parts are located the wing $e$ of the clamp D will lie within said groove and lock the crank against axial rotation on the axle.

When the axle, crank, and clamp have been properly assembled, the locking-nut E is placed on the screw-projection C and screwed home, making a neat finish, as shown at Fig. 2, and securely locking all the parts together in their proper relation.

In lieu of the construction shown at Figs. 1 and 2, a duplex form of construction, such as shown in Figs. 3 and 4, may be used, which, as shown, involves providing the head of the crank with two shoulders $b$, the axle with two channels or grooves, and the clamp E with two wings $e$. In both constructions shown the result is the same—namely, that the device which locks the crank against rotation upon the axle projects in a longitudinal direction into the groove of the axle instead of transversely, as is the case with the usual cotter-pin, and hence the groove in the axle does not have to be made of inclined or tapering form, and the contact or relation between the wing of the clamp and the groove is more perfect and uniform.

While I have shown and prefer to make the wing e of the clamp D as extending entirely across the head of the crank, it will be understood that it may be varied in this respect without departing from the spirit of my invention so long as sufficient stock of the wing projects into the groove a to constitute a permanent and safe lock.

What I claim as new, and desire to secure by Letters Patent, is—

In combination with the axle A provided with one or more grooves a and the crank B, cut-away as at b and provided with the threaded prolongation C, the clamp D provided with one or more wings e, and the locking nut E, substantially as and for the purpose set forth.

In testimony whereof I affix my signature in presence of two witnesses.

GEORGE W. BENNETT.

Witnesses:
SAMUEL SNELL,
A. K. DETWILER.